US008738912B2

(12) United States Patent
Vanstone et al.

(10) Patent No.: US 8,738,912 B2
(45) Date of Patent: *May 27, 2014

(54) ACCELERATED SIGNATURE VERIFICATION ON AN ELLIPTIC CURVE

(75) Inventors: Scott A. Vanstone, Campbellville (CA); Donald B. Johnson, Manassas, VA (US)

(73) Assignee: Certicom Corp., Mississauga (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/557,968

(22) Filed: Jul. 25, 2012

(65) Prior Publication Data

US 2012/0290836 A1 Nov. 15, 2012

Related U.S. Application Data

(63) Continuation of application No. 13/079,116, filed on Apr. 4, 2011, now Pat. No. 8,312,283, which is a continuation of application No. 12/216,926, filed on Jul. 11, 2008, now Pat. No. 7,930,549, which is a continuation of application No. 10/172,509, filed on Jun. 17, 2002, now Pat. No. 7,415,611, which is a continuation of application No. 08/953,637, filed on Oct. 17, 1997, now Pat. No. 6,424,712.

(51) Int. Cl.
 H04L 9/00 (2006.01)
(52) U.S. Cl.
 USPC .......................................... 713/168

(58) Field of Classification Search
 USPC .............. 713/176, 168, 180; 380/28, 30, 278, 380/282
 See application file for complete search history.

(56) References Cited

U.S. PATENT DOCUMENTS

| | | | |
|---|---|---|---|
| 5,005,200 A | 4/1991 | Fischer | |
| 5,351,297 A | 9/1994 | Miyaji et al. | |
| 5,442,707 A * | 8/1995 | Miyaji et al. | .................... 380/30 |
| 5,497,423 A | 3/1996 | Miyaji | |
| 5,572,454 A | 11/1996 | Lee et al. | |
| 5,638,447 A | 6/1997 | Micali | |
| 5,761,305 A | 6/1998 | Vanstone et al. | |
| 5,799,088 A | 8/1998 | Raike | |
| 6,157,721 A | 12/2000 | Shear et al. | |
| 6,279,110 B1 | 8/2001 | Johnson et al. | |
| 6,424,712 B2 | 7/2002 | Vanstone et al. | |
| 6,526,509 B1 | 2/2003 | Horn et al. | |
| 6,782,100 B1 | 8/2004 | Vanstone et al. | |

FOREIGN PATENT DOCUMENTS

WO 9637064 11/1996

* cited by examiner

Primary Examiner — Beemnet Dada
(74) Attorney, Agent, or Firm — Novak Druce Connolly Bove + Quigg LLP

(57) ABSTRACT

A public key encryption system exchanges information between a pair of correspondents. The recipient performs computations on the received data to recover the transmitted data or verify the identity of the sender. The data transferred includes supplementary information that relates to intermediate steps in the computations performed by the recipient.

36 Claims, 5 Drawing Sheets

ACCELERATED SIGNATURE VERIFICATION ON AN ELLIPTIC CURVE

CROSS-REFERENCE TO RELATED APPLICATIONS

This application is a continuation of U.S. patent application Ser. No. 13/079,116 filed on Apr. 4, 2011, which is a continuation of U.S. patent application Ser. No. 12/216,926 filed on Jul. 11, 2008 (now U.S. Pat. No. 7,930,549), which is a continuation of U.S. patent application Ser. No. 10/172,509 filed on Jun. 17, 2002 (now U.S. Pat. No. 7,415,611), which is a continuation of U.S. patent application Ser. No. 08/953,637 filed on Oct. 17, 1997 (now U.S. Pat. No. 6,424,712), all of which are incorporated herein by reference.

FIELD OF THE INVENTION

The present invention relates to public key data communication systems.

BACKGROUND OF THE INVENTION

Public key data communication systems are used to transfer information between a pair of correspondents. At least part of the information exchanged is enciphered by a predetermined mathematical operation by the sender and the recipient may perform a complementary mathematical operation to decipher the information.

A typical example of such a system is a digital signature protocol. Digital signatures are used to confirm that a message has been sent by a particular party and that the contents have not been altered during transmission.

A widely used set of signature protocols utilizes the El Gamal public key signature scheme that signs a message with the sender's private key. The recipient may then recover the message with the sender's public key.

Various protocols exist for implementing such a scheme and some have been widely used. In each case however the recipient is required to perform a computation to verify the signature. Where the recipient has adequate computing power this does not present a particular problem but where the recipient has limited computing power, such as in a "Smart card" application, the computations may introduce delays in the verification process.

Public key schemes may be implemented using one of a number of multiplicative groups in which the discrete log problem appears intractable but a particularly robust implementation is that utilizing the characteristics of points on an elliptic curve over a finite field. This implementation has the advantage that the requisite security can be obtained with relatively small orders of field compared with, for example, implementations in Zp* and therefore reduces the bandwidth required for communicating the signatures.

In a typical implementation a signature component s has the form:

$s = ae + k \pmod{n}$ where:
P is a point on the curve which is a predefined parameter of the system
k is a random integer selected as a short term private or session key, and has a corresponding short term public key R=kP
a is the long term private key of the sender and has a corresponding public key aP=Q
e is a secure hash, such as the SHA hash function, of a message m and short term public key R, and
n is the order of the curve.

The sender sends to the recipient a message including m, s, and R and the signature is verified by computing the value −(sP−eQ) which should correspond to R. If the computed values correspond then the signature is verified.

In order to perform the verification it is necessary to compute a number of point multiplications to obtain sP and eQ, each of which is computationally complex. Other protocols, such as the MQV protocols require similar computations when implemented over elliptic curves which may result in slow verification when the computing power is limited.

Typically, the underlying curve has the form y2+xy=x3+ax+b and the addition of two points having coordinates (x1, y1) and (x2,y2) results in a point (x3,y3) where:

$$x_3 = \left(\frac{y_1 \oplus y_2}{x_1 \oplus x_2}\right)^2 \oplus \frac{y_1 \oplus y_2}{x_1 \oplus x_2} \oplus x_1 \oplus x_2 \oplus a \ (P \neq Q)$$

$$y_3 = \left(\frac{y_1 \oplus y_2}{x_1 \oplus x_2}\right) \oplus (x_1 \oplus x_3) \oplus x_3 \oplus y_1 \ (P \neq Q)$$

The doubling of a point i.e. P to 2P, is performed by adding the point to itself so that $$y_3 = \left\{x_1^2 \oplus \left(x_1 \oplus \frac{y_1}{x_1}\right)\right\} x_3 \oplus x_3$$

$$x_3 = x_1^2 \oplus \frac{b}{x_1^2}$$

It will be appreciated that successive doubling of the point Q produces values for 2Q, 22Q, 23Q . . . 2jQ and that these values may be substituted in the binary representation of the hash value e and added using the above equations to provide the value eQ. At most this would require t doublings and t point additions for at bit representation of e. Similarly the point P may be doubled successively and the values substituted in the representation of s to obtain sP. However, the generation of each of the doubled points requires the computation of both the x and y coordinates and the latter requires a further inversion. These steps are computationally complex and therefore require either significant time or computing power to perform. Substitution in the underlying curve to determine the value of y is not practical as two possible values for y will be obtained without knowing which is intended.

It is therefore an object of the present invention to provide a method and apparatus in which the above disadvantages are obviated or mitigated.

SUMMARY

There is provided a method for performing at least one public key operation at a computing device in a communication system, said public key operation operable using information pertaining to at least one coordinate of a point on an elliptic curve defined over a finite field, the method comprising: obtaining supplementary information pertaining to at least one coordinate of a multiple of said point, said multiple defined by scalar multiplication on said elliptic curve; and utilizing said supplementary information to perform said public key operation. There is also provided a method at a computing device in a communication system to facilitate at least one public key operation at a second computing device in said communication system, said public key operation operable using information pertaining to at least one coordinate of a point on an elliptic curve defined over a finite field, the method comprising: obtaining supplementary information pertaining to at least one coordinate of a multiple of said point, said multiple defined by scalar multiplication on said elliptic curve; and providing said supplementary information to said second computing device for use in performing said public key operation. Computer readable media and computing devices for performing the above methods are also provided.

BRIEF DESCRIPTION OF THE DRAWINGS

Embodiments of the present invention will now be described by way of example only with reference to the accompanying drawings, in which.

DESCRIPTION OF THE PREFERRED EMBODIMENTS

Figure 1:
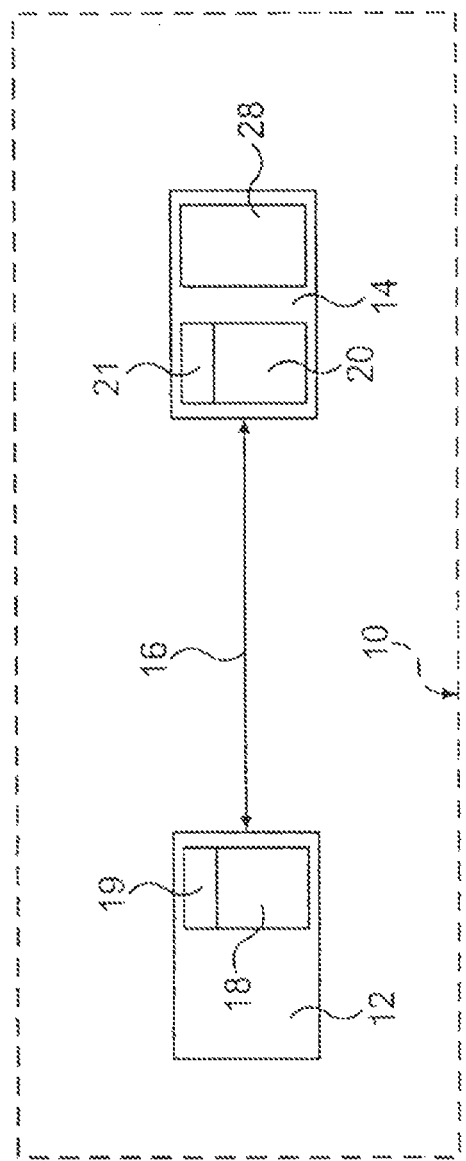
FIG. 1 is a schematic representation of a communication system.

Referring therefore to FIG. 1, a data communication system 10 includes a pair of correspondents, designated as a sender 12, and a recipient 14, who are connected by a communication channel 16. Each of the correspondents 12,14 includes an encryption unit 18,20 respectively that may process digital information and prepare it for transmission through the channel 16 as will be described below. Each of the correspondents 12,14 also includes a computational unit 19,21 respectively to perform mathematical computations related to the encryption units 18,20. The computational power of the units 19,21 will vary according to the nature of the correspondents 12,14 but for the purpose of the present disclosure, it will be assumed that the unit 19 has greater power than that of unit 21, which may in fact be a Smart card or the like.

Figure 2:
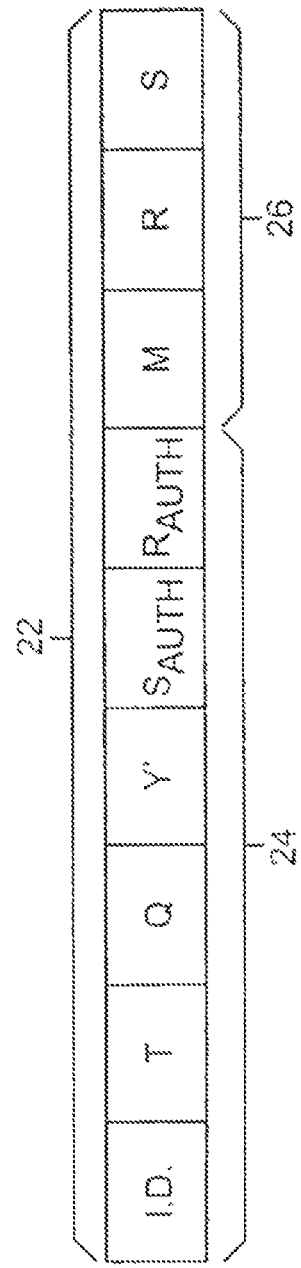
FIG. 2 is a representation of the data transmitted over the communication system in a first embodiment.

In accordance with a first embodiment, the sender 12 assembles a data string 22 shown schematically in FIG. 2. The data string 22 includes a certificate 24 from the certifying authority CA that includes the an identifier I.D. of the sender; a time stamp T; the public key Q of the sender, a string of bits y' representing supplementary information; the signature component sauth of the certifying authority; and the short term public key Rauth of the certifying authority. The data string 22 also includes a senders certificate 26 that includes the message m, the senders short term public key R and the signature component s of the sender. The string of bits y' included in the certificate 24 is obtained from the computational unit 19. The unit 19 performs at least part of the mathematical operations required to verify the signature at the recipient 14 and extracts from the computations the supplementary information y'. When assembled, the data string 22 is sent over the channel 16 to the intended recipient 18.

For simplicity it will be assumed that the signature component s of the sender 12 is of the form s=ae+k(mod n) as discussed above, although it will be understood that other signature protocols may be used. To verify the signature, sP−eQ must be computed and compared with R.

The certifying authorities signature component sauth is of similar form with its message m composed of the identifier I.D., time T and the sign bits y'.

The first step in the verification by the recipient 14 is to retrieve the value of Q and the sign bits y' from the certificate 24 using the certifying authorities public key. A hash value e' is also computed from the message m and the coordinates of the point R in the senders certificate 26. The recipient 14 is then able to perform the verification by computing sP and e'Q.

However, as noted above, the computational unit 21 has limited computing power and the computation of sP and e'Q may be time-consuming.

One or more of a number of enhancements are therefore adopted to facilitate the verification. In a first embodiment, use is made of the fact that P is a long-term system parameter. Values corresponding to integral multiples of P may be stored at the recipient 14 in lookup tables indicated at 28 in FIG. 1. The integer corresponding to s is thus located in table 28 and the value sP retrieved to provide a first component of the verification.

The value of Q will vary from sender to sender and accordingly it is not practical to pre-compute the possible values of e'Q in a manner similar to sP. To facilitate the computation of e'Q, e' is treated as a binary representation of an integer with each bit indicative of a coefficient of successive values of 2j. The computational unit 19 at sender 12 is used to double successively the point Q so that the coordinates of 2jQ are obtained. The most significant bit of the y coordinate indicates the "sign" of the y coordinate and a string of bits representing the signs of the y coordinates of the successively doubled points is incorporated as the supplementary information y' in the certificate 24. To compute the value of e'Q at the recipient 14, the x coordinate of the point Q is successively doubled by applying the equation noted above so that the x coordinates of successive values of 2jQ are obtained. Where the binary representation of e' indicates that a value of 2jQ is required (ie. where the coefficient is "1"), the corresponding value of the y coordinate is determined by substitution in the underlying curve. Two possible values of the y coordinate are obtained and the appropriate value is determined by reference to the sign bits y' retrieved from the certificate 24. Accordingly, the computation of the y coordinate that requires an inversion is avoided.

Having obtained each pair of coordinates for the coefficients of 2jQ, they may be combined to provide the value for e'Q and combined with sP to obtain sP-e'Q. This is then compared with the recovered value of R for verification.

It will be appreciated that sP may be computed in a manner similar to e'Q with the inclusion of additional sign bits for the y coordinates of 2jP in the certificate 24. It is, however, believed to be preferable to utilize the lookup tables 28 where practical.

Figure 3:
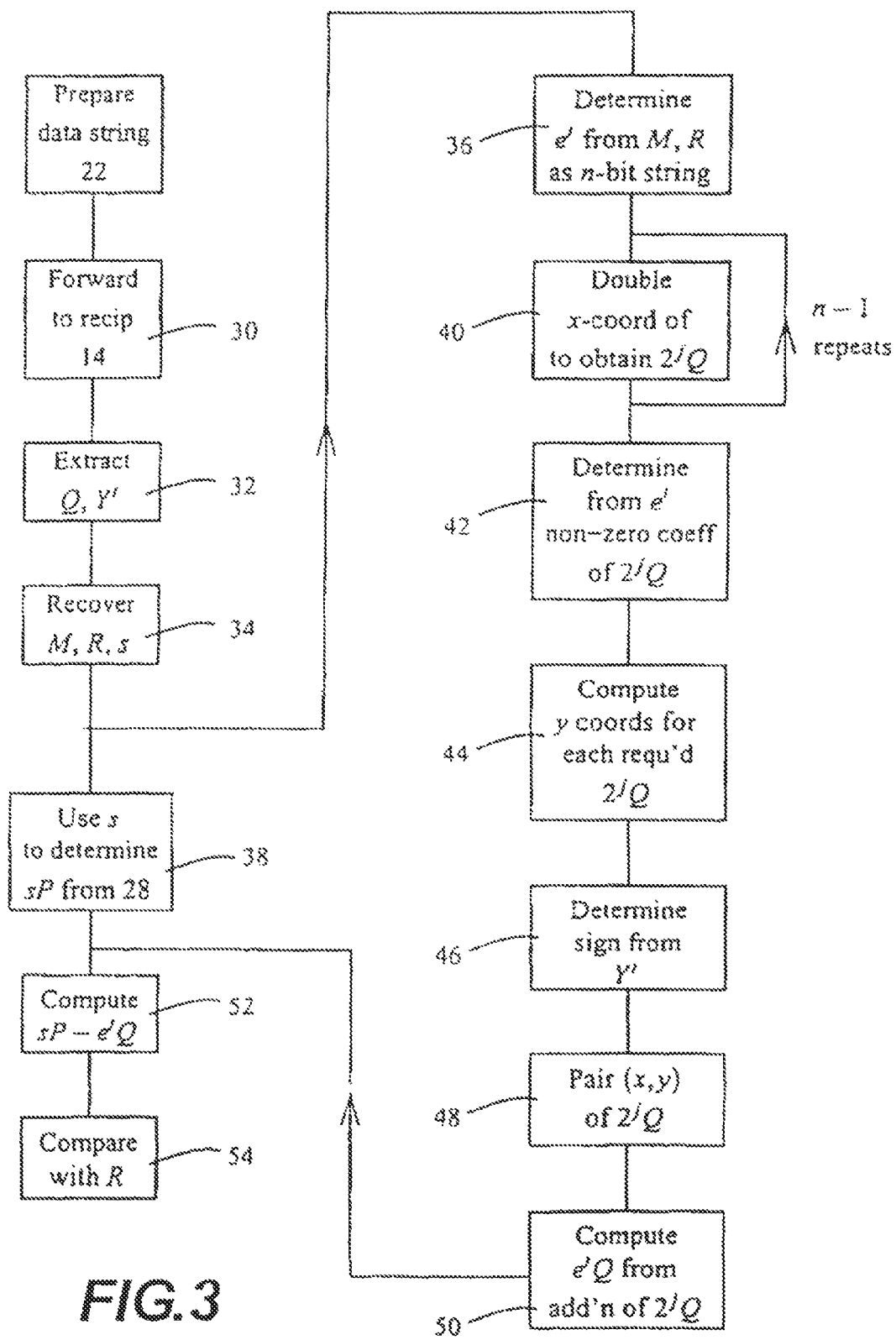
FIG. 3 is a flow chart showing the steps in verifying a signature transmitted over the system of FIG. 1 using the data format of FIG. 2.
Figure 4:
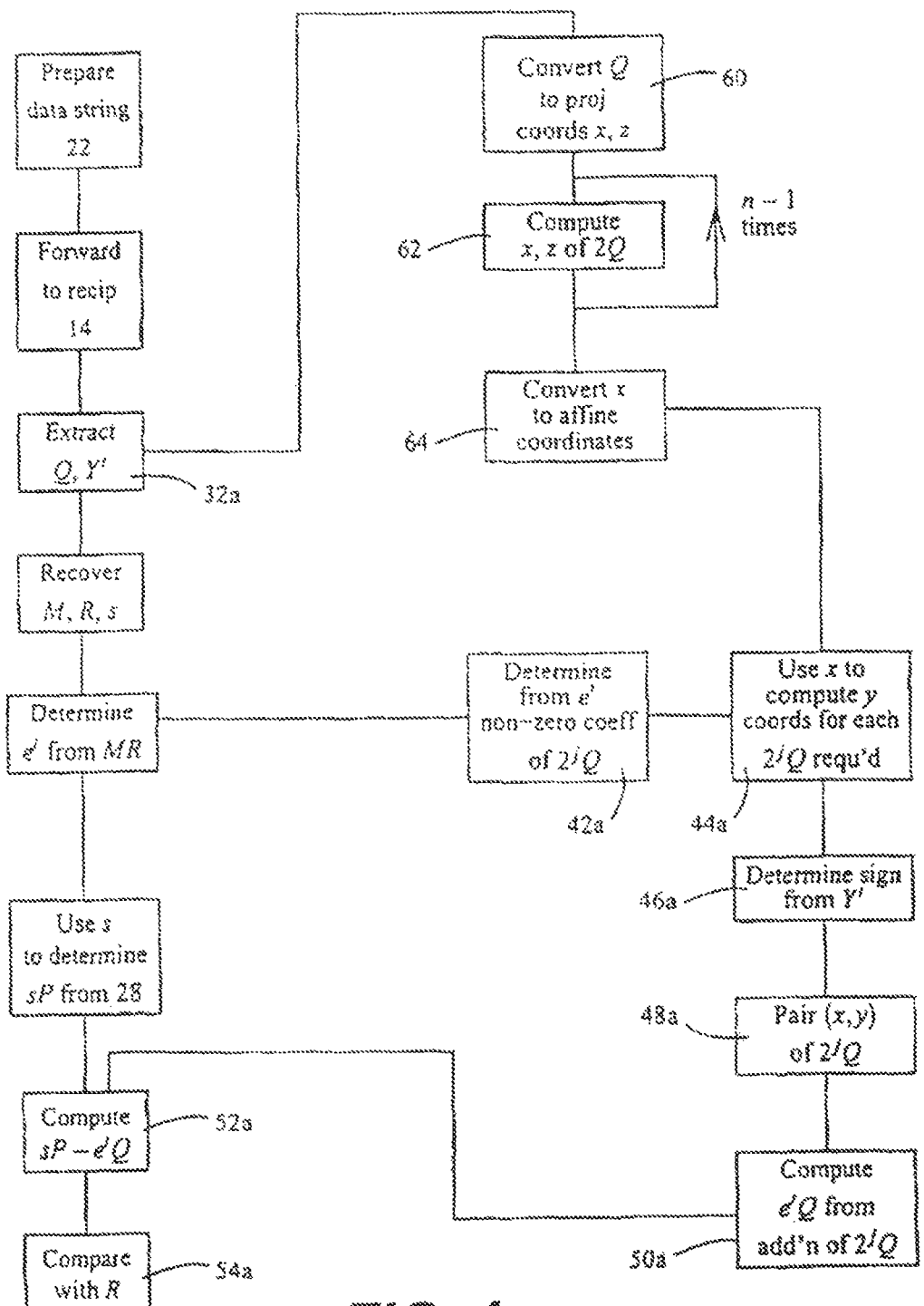
FIG. 4 is a flow chart showing the verification according to a second embodiment.

Although the above procedure reduces the computational complexities, the computation of the x coordinate still requires an inversion. Inversion is relatively costly and to facilitate the computation, the process of FIG. 3 is modified as shown in FIG. 4. Upon receipt of the data string 22, the recipient 14 recovers the affine coordinates (x, y) of the point Q and converts them into projective coordinates (x, y, z) by replacing x with x/z and y with y/z.

The value of the x and z coordinates of the point 2Q can then be calculated using the relationship in that 2(x1, y1, z1)=(x2, y2, z2) where $x_2 = x_1^4 + z_1^4 b$ and $z_2 = (x_1 z_1)^2$ "b" is the constant associated with the underlying curve and can be chosen suitably small, i.e. one word.

Once the x and z values for 2Q have been computed, they may be used in a similar manner to obtain the values of x and z for 4Q. This may be repeated up to 2tQ so that the t sets of projective coordinates each representing the x and z coordinates of a respective one of 2jQ $0 \leq j \leq t$ are obtained.

Each of the projective x coordinates is converted into a corresponding affine coordinate by dividing the x coordinate by the z coordinate. The x coordinate of the respective values of 2jQ can then be used where necessary in the representation of e' to obtain the corresponding y coordinates by substitution in the equation representing the underlying curve. The corresponding y value is obtained by inspection of the sign bits y' included in the data string 22 which indicates the appropriate value.

With each of the coordinates obtained, the values for 2jQ can be substituted in the binary representation of e and the resultant value of eQ obtained. As the representation of e will be a string of 1's and 0's, only those values having a coefficient of 1 need be combined to simplify the computation further. The result may then be combined with the value of sP and compared with the retrieved value of R to obtain a verification.

It will be seen, therefore, that a verification is obtained without requiring an inversion at each addition to obtain the successive x coordinates which facilitates the verification process. The computation of the values of 2jQ can be readily obtained if the elliptic curve is implemented over the field GF2 when represented in normal basis representation. In this case, the computation of x14 and z14 is obtained by two cyclic shifts of the representation of the respective coordinates. After multiplying with "b", the result is XOR'd to obtain the value of the resultant x coordinate. Similarly, the value of the z coordinate can be obtained from a cyclic shift of the product of x1 and z1.

The above procedure may be modified with an increase in bandwidth by forwarding in the certificate the x coordinate of Q and each of the y coordinates of 2jQ. Some of these will of course be redundant depending on the representation of e'. However, in this manner the computation of the y coordinates is avoided but the length of the message is increased. This may be acceptable, particularly where limited computing power is available at the recipient.

As a further variant, the message could be modified to include both the x and y coordinates for each value of 2jQ with the attendant redundancy. This has the effect of minimizing the computation of eQ but does increase the message length.

Figure 5:
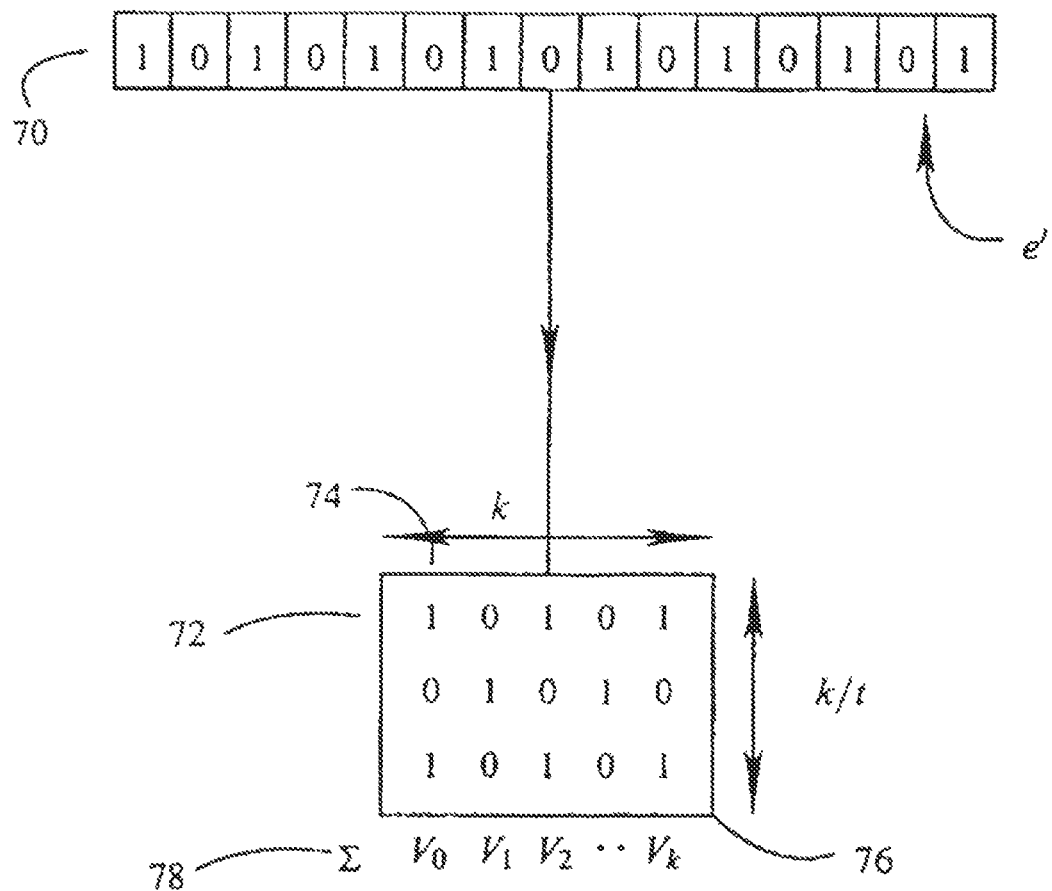
FIG. 5 is a representation of the data transmitted over the communication system in a third embodiment.
Figure 6:
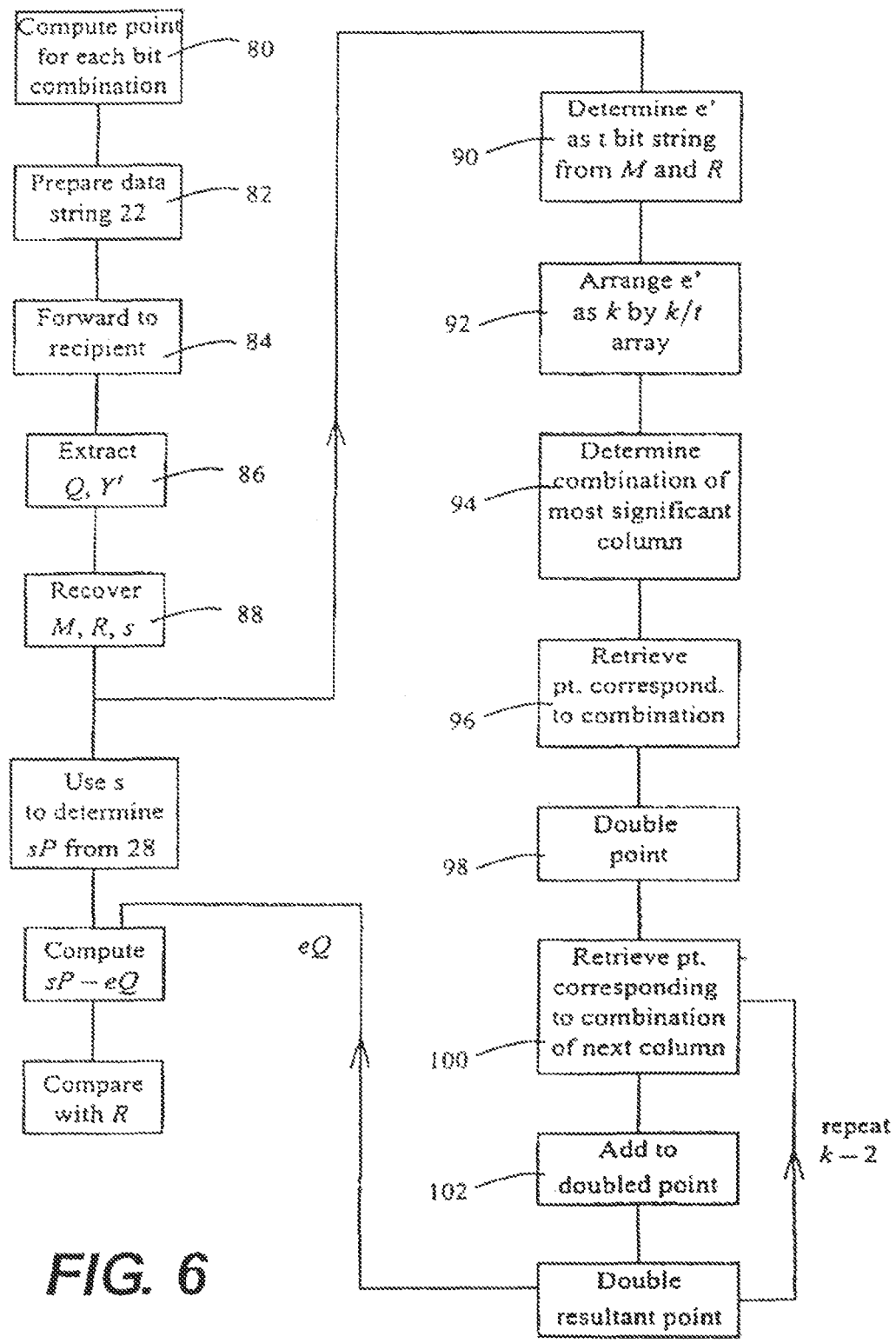
FIG. 6 is a flow chart showing the steps of verifying the signature sing the data format of FIG. 5.

A further embodiment is shown in FIGS. 5 and 6 where combing is used to facilitate the computation of eQ. If e is at bit binary number, it may be represented as a k-fold matrix having k columns and t/k rows. If the sum of each column is V1, V2, V3 . . . Vk, then $$e = V_1 + 2V_2 + 2V^2 V_3 + \ldots + 2^{k-2} V_{k-1} + 2^{k-1} V_k, \text{ and}$$

$$eQ = V_1 Q + 2V_2 Q + 2V^2 V_3 Q + \ldots + 2^{k-2} V_{k-1} Q + 2^{k-1} V_k Q$$

Each of the columns may have one of 2t/k combinations of bits. Each combination will produce a particular value Σ1, Σ2, Σ3 etc. for V which has to be multiplied by the point Q to obtain the coordinates of the point 2jVjQ. The certificate 24 is thus modified to include in an ordered, retrievable manner the coordinates of the 2t/k possible points resulting from the combination of bits in the columns which have been precomputed by the sender 12. Upon receipt, the recipient 14 extracts the message m and point R to obtain a recovered value for e. This bit string is arranged in a k-fold matrix of established configuration and the bit combination of the most significant column determined. The coordinates of the point resulting from this combination is obtained from the certificate 24, and doubled. The point corresponding to the bit combination in the next most significant column is retrieved and added to the result of the previous doubling. This is then doubled and the procedure repeated until e'Q is computed. In this way a reduced number of point additions is required, a maximum of 2k, and the bandwidth required to transmit the information is reduced. The sign bit string y' may be utilized to provide the sign bits of the y coordinates of the doubled points and added points to facilitate the computation.

In each of the above cases, the data string 22 includes additional information that may be utilized to facilitate the computation of the value eQ. In each case however the integrity of the signature is not compromised as the information could be computed from the contents of the data string as part of the verification process. The value of e with which the information is subsequently used is derived from the received data string so that tampering with the senders certificate would produce an incorrect verification. The additional information is contained within the certifying authorities certificate and forms part of the signature component and so that it cannot be substituted by an attacker without detection.

It will be seen therefore that in each embodiment the verification of a signature is facilitated by forwarding information to the recipient in addition to that required for verification and which facilitates the verification computation. It will be appreciated that while the embodiments describe the operation between a pair of correspondents, one of those correspondents could be a certifying authority or trusted intermediary. The CA receives a message from an originating correspondent, computes the supplementary information, assembles the data string and forwards the data string to the recipient. In this manner, the public key exchange between a pair of correspondents each having limited computing power may be facilitated.

The above embodiments have been described in the context of a signature verification protocol. However, the techniques may be utilized on other public key operations such as key agreement or key transport protocols. Examples of these protocols are the MQV protocols or protocols set out in IEEE P 21363 draft standard. In such protocols, it is typically necessary to generate a scaled multiple of a point on the curve, i.e. kP where k is an integer and P is a point on the curve. Accordingly, the information transferred between correspondents may be modified to include supplementary information to facilitate the computations involved in such protocols.

The invention claimed is:

1. A method for performing at least one public key operation at a computing device in a communication system, said public key operation operable using information pertaining to at least one coordinate of a point on an elliptic curve defined over a finite field, the method comprising the computing device operating one or more processors for:
   obtaining, using the one or more processors, supplementary information pertaining to at least one coordinate of a multiple of said point, said multiple defined by scalar multiplication on said elliptic curve, said supplementary information being additional to information sufficient to permit said public key operation to be performed; and
   utilizing said supplementary information to perform said public key operation.

2. The method of claim 1, wherein the supplementary information pertains to at least one coordinate of one or more points on the elliptic curve obtainable by successively doubling said point.

3. The method of claim 1, wherein said point is a system parameter of said communication system.

4. The method of claim 1, wherein said point is a public key of a second computing device in said communication system.

5. The method of claim 1, wherein the supplementary information comprises at least one of a pair of coordinates for a plurality of multiples of said point.

6. The method of claim 1, wherein said information is additionally utilized to perform the public key operation.

7. The method of claim 1, wherein said public key operation comprises verifying a signature, and said method further comprises receiving said signature.

8. The method of claim 1, wherein said public key operation comprises deriving a secret key using a key agreement protocol.

9. The method of claim 1, wherein said computing device obtains said supplementary information by receiving a certificate comprising said supplementary information.

10. The method of claim 1, wherein said computing device obtains said supplementary information from a second computing device in said communication system.

11. The method of claim 1, wherein said supplementary information is used to facilitate at least one intermediate operation in said public key operation.

12. The method of claim 1, wherein the supplementary information comprises an indication as to which of a pair of possible values resulting from an intermediate operation in said public key operation is an intended value.

13. The method of claim 11, wherein said at least one intermediate operation comprises utilizing said supplementary information to determine at least one affine coordinate of said multiple of said point.

14. The method of claim 2, wherein the supplementary information comprises at least one coordinate of each of said one or more points obtainable by successfully doubling said point, and said public key operation utilizes a portion of said supplementary information.

15. The method of claim 1, wherein said supplementary information is obtained from a table stored at said computing device.

16. The method of claim 13, wherein said supplementary information is utilized to determine said affine coordinate from two possible values, said possible values obtained by processing projective coordinates of said multiple of said point.

17. The method of claim 1, wherein said obtaining comprises obtaining a signed copy of said supplementary information.

18. A non-transitory computer-readable medium comprising instructions that are operable when executed by one or more processors to execute operations for performing at least one public key operation, said public key operation operable using information pertaining to at least one coordinate of a point on an elliptic curve defined over a finite field, the operations comprising:
obtaining supplementary information pertaining to at least one coordinate of a multiple of said point, said multiple defined by scalar multiplication on said elliptic curve, said supplementary information being additional to information sufficient to permit said public key operation to be performed; and
utilizing said supplementary information to perform said public key operation.

19. A computing device operable to perform at least one public key operation, said public key operation operable using information pertaining to at least one coordinate of a point on an elliptic curve defined over a finite field, the computing device comprising:
one or more processors configured to:
obtain supplementary information pertaining to at least one coordinate of a multiple of said point, said multiple defined by scalar multiplication on said elliptic curve, said supplementary information being additional to information sufficient to permit said public key operation to be performed; and utilize said supplementary information to perform said public key operation.

20. A method at a computing device in a communication system to facilitate at least one public key operation at a second computing device in said communication system, said public key operation operable using information pertaining to at least one coordinate of a point on an elliptic curve defined over a finite field, the method comprising the computing device operating one or more processors for:
obtaining, using the one or more processors, supplementary information pertaining to at least one coordinate of a multiple of said point, said multiple defined by scalar multiplication on said elliptic curve, said supplementary information being additional to information sufficient to permit said public key operation to be performed; and
providing said supplementary information to said second computing device for use in performing said public key operation.

21. The method of claim 20, wherein the supplementary information pertains to at least one coordinate of one or more points on the elliptic curve obtainable by successively doubling said point.

22. The method of claim 20, wherein said point is a system parameter of said communication system.

23. The method of claim 20, wherein said point is a public key of said computing device.

24. The method of claim 20, wherein the supplementary information comprises at least one of a pair of coordinates for a plurality of multiples of said point.

25. The method of claim 20, wherein the second computing device additionally utilizes said information to perform said public key operation.

26. The method of claim 20, wherein said public key operation comprises verifying a signature, and said method further comprises receiving said signature.

27. The method of claim 20, wherein said public key operation comprises deriving a secret key using a key agreement protocol.

28. The method of claim 20, wherein said computing device is a certificate authority device, and provides said supplementary information by providing a certificate comprising said supplementary information.

29. The method of claim 20, wherein said supplementary information is used to facilitate at least one intermediate operation in said public key operation.

30. The method of claim 20, wherein the supplementary information comprises an indication as to which of a pair of possible values resulting from an intermediate operation in said public key operation is an intended value.

31. The method of claim 29, wherein said at least one intermediate operation utilizes said supplementary information to determine at least one affine coordinate of said multiple of said point.

32. The method of claim 21, wherein the supplementary information comprises at least one coordinate of each of said one or more points obtainable by successfully doubling said point, and said public key operation utilizes a portion of said supplementary information.

33. The method of claim 31, wherein said supplementary information is utilized to determine said affine coordinate from two possible values, said possible values obtained by processing projective coordinates of said multiple of said point.

34. The method of claim 20, wherein said obtaining comprises obtaining a signed copy of said supplementary information.

35. A non-transitory computer-readable medium comprising instructions that are operable when executed by one or more processors to perform operations to facilitate at least one public key operation at a second computing device, said public key operation operable using information pertaining to at least one coordinate of a point on an elliptic curve defined over a finite field, the operations comprising:
  obtaining supplementary information pertaining to at least one coordinate of a multiple of said point, said multiple defined by scalar multiplication on said elliptic curve, said supplementary information being additional to information sufficient to permit said public key operation to be performed; and
  providing said supplementary information to said second computing device for use in performing said public key operation.

36. A computing device operable to facilitate at least one public key operation at a second computing device, said public key operation operable using information pertaining to at least one coordinate of a point on an elliptic curve defined over a finite field, the computing device comprising:
  one or more processors configured to:
  obtain supplementary information pertaining to at least one coordinate of a multiple of said point, said multiple defined by scalar multiplication on said elliptic curve, said supplementary information being additional to information sufficient to permit said public key operation to be performed; and
  provide said supplementary information to said second computing device for use in performing said public key operation.

* * * * *